US008817013B2

(12) United States Patent
Meichsner

(10) Patent No.: US 8,817,013 B2
(45) Date of Patent: Aug. 26, 2014

(54) METHOD FOR PROCESSING A SPATIAL IMAGE

(75) Inventor: Jens Meichsner, Weimar (DE)

(73) Assignee: Visumotion International Ltd., Wanchai (HK)

(*) Notice: Subject to any disclaimer, the term of this patent is extended or adjusted under 35 U.S.C. 154(b) by 960 days.

(21) Appl. No.: 12/669,014

(22) PCT Filed: Jun. 21, 2008

(86) PCT No.: PCT/EP2008/005026
§ 371 (c)(1),
(2), (4) Date: Jan. 27, 2010

(87) PCT Pub. No.: WO2009/010152
PCT Pub. Date: Jan. 22, 2009

(65) Prior Publication Data
US 2010/0289796 A1 Nov. 18, 2010

(30) Foreign Application Priority Data

Jul. 13, 2007 (DE) .................. 10 2007 033 239

(51) Int. Cl.
G06T 15/00 (2011.01)
G06T 1/00 (2006.01)
G06F 3/00 (2006.01)
G11B 27/034 (2006.01)
H04N 13/00 (2006.01)

(52) U.S. Cl.
CPC .......... H04N 13/0003 (2013.01); G11B 27/034 (2013.01)
USPC ............................ 345/419; 345/522; 715/700

(58) Field of Classification Search
USPC .................. 345/382, 348, 522, 419; 715/700
See application file for complete search history.

(56) References Cited

U.S. PATENT DOCUMENTS 5,892,506 A * 4/1999 Hermanson ............. 715/202
5,929,859 A 7/1999 Meijers
(Continued)

FOREIGN PATENT DOCUMENTS

CN 101025901 A 8/2007
JP 2008270903 A 11/2008
(Continued)

OTHER PUBLICATIONS

Evers-Senne, J.-F., et al., "Image Based Interactive Rendering with View Dependent Geometry," *EUROGRAPHICS 2003*, vol. 22, No. 3, pp. 573-582 (2003).
(Continued)

Primary Examiner — Kee M Tung
Assistant Examiner — Haixia Du
(74) Attorney, Agent, or Firm — Patterson Thuente Pedersen, P.A.

(57) ABSTRACT

The invention relates to a method for processing a spatial image assembled from partial images or a time sequence of such images by processing the image data in individual processing modules according to an execution sequence and depending on adjustable processing parameters, wherein each module performs processing steps and the sequence is determined by a selectable linking of the. Further, each module is able to exchange data with the modules to which it is linked. If parameters are changed for two modules linked to each other in the execution sequence, (a) an upstream module transmits to a downstream module which areas of the image data present at the upstream module are affected by the change, (b) the downstream module transmits to the upstream module which image data it requires to perform the processing steps thereof. The upstream module recalculates only said image data, and transmits them to the downstream module.

15 Claims, 2 Drawing Sheets

(56) References Cited

U.S. PATENT DOCUMENTS

| | | | |
|---|---|---|---|
| 6,266,053 B1* | 7/2001 | French et al. | 715/255 |
| 6,584,152 B2* | 6/2003 | Sporer et al. | 375/240.01 |
| 6,768,499 B2 | 7/2004 | Miller et al. | |
| 6,847,728 B2 | 1/2005 | Tao et al. | |
| 6,867,782 B2* | 3/2005 | Gaudette et al. | 345/530 |
| 7,046,271 B2 | 5/2006 | Doerfel et al. | |
| 7,403,209 B2* | 7/2008 | Liao et al. | 345/629 |
| 8,024,657 B2* | 9/2011 | Larsen et al. | 715/723 |
| 8,150,217 B2 | 4/2012 | Nakamura et al. | |
| 2002/0158872 A1 | 10/2002 | Randel | |
| 2003/0156822 A1 | 8/2003 | Um et al. | |
| 2004/0117730 A1* | 6/2004 | Ibrahim et al. | 715/500.1 |
| 2005/0135675 A1 | 6/2005 | Chen et al. | |
| 2006/0088206 A1* | 4/2006 | Era | 382/154 |
| 2006/0224960 A1* | 10/2006 | Baird-Smith | 715/700 |
| 2007/0195161 A1 | 8/2007 | Nakaya | |
| 2008/0253683 A1 | 10/2008 | Nakamura et al. | |

FOREIGN PATENT DOCUMENTS

| | | |
|---|---|---|
| WO | WO 97/23097 | 6/1997 |
| WO | WO 99/52276 | 10/1999 |
| WO | WO 01/56302 A1 | 8/2001 |
| WO | WO 2006/049384 A1 | 5/2006 |
| WO | WO 2008/040918 A2 | 4/2008 |

OTHER PUBLICATIONS

Zhang, Ye, et al., "On 3-D Scene Flow and Structure Recovery From Multiview Image Sequences," *IEEE Transactions on Systems, Man, and Cybernetics—Part B: Cybernetics*, vol. 1, No. 33, No. 4, pp. 592-606 (Aug. 2003).

VisuMotion, "Plastic handle the pictures—without 3D glasses", Computermagazin.com, Mar. 2007.

Smolić et al., "Interactive 3-D Video Representation and Coding Technologies", Proc. IEEE, vol. 93(1), 2005, pp. 98-110.

Oliveira et al., "Real-Time Relief Mapping on Arbitrary Polygonal Surfaces", Instituto de Informática UFRGS, prior to Nov. 29, 2011, 9 pages.

Oliveira et al., "Relief Texture Mapping" Computer Graphics, Siggraph 2000 Conference Proceedings, New Orleans, LA, Jul. 23-28, 2000, 10 pages.

\* cited by examiner

METHOD FOR PROCESSING A SPATIAL IMAGE

PRIORITY CLAIM

The present application is a National Phase Entry of PCT Application No. PCT/EP2008/005026, filed Jun. 21, 2008, which claims priority to German Application Number 1020070033239.6, filed Jul. 13, 2007, the disclosures of which are hereby incorporated by reference herein in their entirety.

FIELD OF THE INVENTION

The invention relates to the editing of stereoscopic images. More specifically, the invention relates to the efficient editing of three-dimensional images from partial images or a chronological sequence of images.

BACKGROUND OF THE INVENTION

At the current state-of-the-art several methods are known with which images or image sequences like videos can be edited with the help of a computer, whereby the state of editing is always indicated. For simplest image editing methods the user must choose, which filter or editing module he wants to apply to the image. There are, for example, diffusing screen modules, sharpness modules and color correction modules, just to name a few. When choosing a filter, then this filter will be used for all image data or image data in a freely definable segment respectively. The resulting image will be computed and displayed. Thus, all image data will be re-computed for the resulting image.

In modern methods of image editing various editing modules can be joined into editing sequences or batch processes, such as an execution sequence, and will then be displayed as the preferred graphics. Utilizing this type of process, the user himself may select the editing module and assemble it like a tree structure. The editing modules then correspond to nodes; the editing modules or nodes respectively can then be linked with one another so that, for example, data from several preceding editing modules flows to succeeding editing modules. This is, for example, the case when data from two different images are to be combined into a complete image. In that case it is also possible for the user to design an editing module and bind it as a so-called plug-in into the program and the execution sequence. In the case of two linked editing modules, the necessary editing steps are first carried out in the execution sequence of the preceding editing module, the entire image data, which is at least partially modified by the editing module, is then transmitted onto the preceding editing module in the execution sequence where it is then also edited.

Similar methods for image editing were also established in the editing of image sequences in video editing programs. Individual image sequences are referred to as streams and, just as two images can be superimposed into one image, several streams can likewise be combined into one stream, when, for example, one image sequence is to be subtitled. In this case, each stream can be edited independent of the other. The above mentioned filter functions can also be applied in this case. Once the editing of such sequences or a combination a sequences is completed, the result will be shown on the screen. Even during editing it is possible to separately indicate the individual steps or the individual image sequences.

In this process, all image data is recomputed if there is any change in the editing parameters, such as the addition of a color filter or a diffusing screen and transmitted downwards in accordance with the tree structure or execution sequence respectively, starting from the module where the change of parameters took place or respectively from the beginning of the globally adjustable parameter and transmitted downward according to the hierarchy. All image data will be recomputed and transmitted downward according to the hierarchy.

Such methods, which allow the user a graphic surface for the editing of video sequences, are described in the U.S. Pat. No. 6,768,499. Editing modules are graphically compiled according to an execution sequence in a hierarchic tree structure. The tree structure comprises nodes, on which e.g. various streams or tracks are combined, other nodes constitute the editing modules. The nodes are connected via the tree structure.

Arrangements using a similar method are described in WO 99/52276. Here, too, several data streams can be edited and combined, whereby the editing can be accelerated by editing several data streams simultaneously. In this way real-time editing should be made possible, i.e. that the results can be immediately shown on the screen and through simultaneous shoots the results obtained can be displayed on the screen without delay.

In both methods and also in the previously described processes, all computations are carried out on the processor motherboard. While the methods described are adequate for two dimensional image contents, one quickly reaches the limit when applying these methods to three-dimensional contents, as the data volume to be edited is many times larger. Although, in principle, two views taken from different perspectives of an object are in order to produce a stereoscopic image or stereoscopic image sequence, which can convey a stereoscopic impression, the viewer's mobility before the screen can be greatly constrained; as a rule, several views are taken from different perspectives or produced retrospectively. Typically eight views are used. According to the known state-of-the-art methods, a real-time display of 3D video editing is not possible, i.e. after carrying out one working step there is always a certain lapse until the result can be shown on the screen. The main problem is dealing with the high data volume.

An attempt at reducing the data volume can be found in US2003/0156822 A1. The reference describes a method of editing image sequences consisting of several tracks or streams respectively. If a segment of such a track is deleted during editing, there will not be any actual deletion of data on the hard disk or the storage medium, but certain markings, so-called pointers, are placed, which point to the respective positions within the track.

The track itself will not be interfered with, which simplifies the data management and the editing time. Image sequences, which are edited in US2003/0156822 A1, concern so-called multi-view streams, i.e. image sequences, which have a common time axis. The contents, however, can be different. It may, for example, concern television images taken during a show of which two are taken of a moderator from different perspectives and a third camera may take the audience.

When using such multi-view streams, it is possible to develop the streams in such a way that each stream shows the same scene, but from slightly different perspective. The data streams of the various views can then be handled and edited and shown as stereoscopic image on a suitable screen. In one of the methods described in WO2006/049384, data streams of all views are edited. After an initial correction eliminates the noise, the camera parameters are determined and a model of the scene is computed. This method provides information on the depth, viewed from the camera position, of the placement of the individual object. From this information, following further editing steps, stereoscopically presentable images can be produced. Transmission on image sequences, however, is cumbersome due to the data volume that needs to be edited and unsatisfactory, as too many computations have to be carried out. Although these computations are necessary in order to be able to produce stereoscopically presentable images, it is not possible to use such pictures or image sequences, if they are edited at a later stage.

The known state-of-the-art methods are hardly suitable for belated image editing and in particular for image sequence for stereoscopic display or multi-view streams respectively, in which filters or functions are to be used on the image data, as it is—even with the currently available efficient processors—not possible to produce the result of the editing in real-time, so that that the viewer has to wait some time for the effect of any changes made by him, i.e. a diffusing screen or color correction. The editing of such image contents is, therefore, very time consuming and expensive.

SUMMARY OF THE INVENTION

It is the objective of the invention to further develop a method for editing stereoscopically presentable images or image sequences in such a way that editing of at least close to real-time is possible. i.e. an operator can see the effect of the changes he made on the adjustment, without any time delay, especially with regard to the stereoscopic display.

The current invention overcomes the problems of the previously described methods in that in the event of a change to one or several editing parameters for each two nodes in the execution sequence, which are linked to one another in the execution sequence, (a) a preceding editing module, which is allocated to the preceding node in the execution sequence, a succeeding editing module, which is allocated in the execution sequence to a to a succeeding node, transmits which sections of the present image data are affected by the changes on the preceding editing module, (b) the succeeding editing module transmits to the preceding editing module, which re-determined image data with changed editing parameters are required and the preceding image module computes only such image data and transmits these to the succeeding editing module.

The image data, which preferably correspond to an image composed of a number n of partial images i or one chronological sequence of such images, with n>1 and i=1, . . . , n. In various embodiments, the image data could have been created as computer graphics or recorded as a camera photograph with n partial images. A mixture of both is also possible, i.e. a multi-view stream with objects partially really taken and partially produced with computer graphic. For editing partial images based on computer graphics, commercially available animation programs like Autodesk Maya or Autodesk 3D Studio MAX are suitable. With these programs, the partial images are rendered as separate perspective views with slightly different camera positions. Alternatively, one of the n partial images i of a depth card can match the scene displayed.

Editing parameters may concern local editing parameters, which are adjusted directly on the preceding editing module or on one of the preceding editing modules or around global editing parameters, which affect the entire execution sequence. For example, if two streams are used one of which one is showing colored text, which is moving from left to right, and should remain in the foreground, and a second stream shows a background scene, which does not move or moves or turns slowly, so that the text is us stereoscopically displayed against the background, then the color of the text, the typeface and the character string, i.e. the text itself, of the first stream is a local editing parameter. As this concerns an image sequence in which the text moves from left to right, a global editing parameter is, for example, the time t.

If, for example, the color of the text is changed, then only the stream which depicts the text must be changed. In a combination of both streams the image data is only re-determined in the sectors of the images on which the text has an effect. A renewed computation of other image data is not necessary. In the current state of technology, data and information in such processes go only in one direction, flowing in the tree from above downwards. However, in the present invention, two linked editing modules can also communicate in the opposite direction. If an editing parameter is changed, then initially the section of the image and image data respectively is determined. This corresponds, for instance, to data stored in an at least two-dimensional matrix, the indices of which correspond to the coordinates in the image or partial image and to one or several value groups for the indices, on which this editing parameter has an effect, i.e. one that is affected by the changes in the parameters. This sector is transmitted successively or even directly to all editing modules at the succeeding nodes. Each of the succeeding editing modules is in that way capable of compiling all segments, which were transmitted to the succeeding nodes, into one segment. The succeeding editing nodes themselves check, whether image data kept, has an effect on the sector which was affected by the change of parameters. If the type setting of a text is changed, then the image data concerning the background scene, is not re-computed.

The last editing module in the execution sequence checks at first, whether image data must be re-computed and, if in the affirmative, which data is required for that purpose. This information is then passed to the preceding editing module, which then carries out the checking. The necessary image data for this preceding editing module can be the same; it can also be other image data. Together with the information regarding succeeding editing modules, this data will then be transmitted on to the next preceding editing module, until recursively the first affected editing module is found, which is affected by the change. In case of branching, several first editing modules may be found. In either case, at least the new image data must be re-computed. Likewise, the respective editing module, on which the last re-computation in the execution sequence took place, is not necessarily the last editing module in the execution sequence.

If a succeeding editing module informs the preceding editing module which image data has to be re-determined, or respectively which it requires in re-determined form, so that it can carry out its editing steps, then this image data from the preceding editing module will be re-computed, whereby additional preceding editing modules must be resorted to. The re-computed image data, and only the recomputed image data, is transmitted to the succeeding editing module. Re-computation of all image data is not necessary. In this way time and computing power can be saved compared to state-of-the-art technology.

As only one part or a section of the image data respectively is recomputed and transmitted to the succeeding editing module, it is implied that at least the initial data, which the editing module needs for the computation, is stored by this editing module. The re-determined and re-transmitted image data, caused by the change of editing parameters, then overwrites a part of the original image data and flows into the process. The editing module computes its starting data, which it then transmits to the next succeeding editing module, then completely or partially renews it, but only transmits the requested or necessary image data respectively to the following editing module.

In a functional embodiment of the invention and when changes in the editing parameters were made, already processed image data in the editing modules are given storage preference, depending on the type of editing steps taken in an editing module. This means that not only are entry data, which are necessary for the editing, partially stored, but also at least that part of the initial data, which does not change, in the event editing parameters are changed. Should color values for a part of the image data change, it would mean that the depth information for different objects in the scene, for example, the above already mentioned text, which floats before a background scene, does not change. If the succeeding editing module determines the depth, then these data need not be re-computed. If the editing steps taken in the editing modules concern only operations that can easily and speedily be carried out, then it can be useful to drop the storage of image data in favor of the storage place and to re-compute these each time.

In a special preferred embodiment of the invention the editing steps are at least partially or preferably carried out on a graphic card. In doing so, the operation which carry out the editing steps of the editing module, is translated as graphic commands for the graphic card, which is, therefore, subject to special requirements. At present these are, in particular, the Open GL 2.0 Standard, in addition the pixel shader Model 3 and/or Open GL shading Language 1.0, or other appropriate commands, must be implemented on the graphics card. Advanced development or relevant function libraries, which are not mentioned here, can also be used. This has the added advantage that the editing can be carried out independent of the original image format, usually RGB-Alpha with 8-Bit color depths each per channel. The graphic card determines internally the computing format to be used.

Other formats of clearly higher quality are also possible, e.g RGB-Alpha with a 10-Bit depth for each color channel or a $^{16}/_{32}$-Bit-Floating-Point-Format Even other color spaces or other formats than RGB respectively can be used, e.g. those that store luminescence and other data. Including the graphic card in the computing operations also contributes that the consequences of changes in the editing parameters can be viewed on the screen in almost real time, which facilitates interactive editing. If the parameters change a great deal and if many intermediate images have to be computed in order to obtain a resulting image, then it would also be possible to leave out certain intermediate result images in the computation (frame dropping). It would also make sense not to transfer all computing operations on the graphics card to ensure that the processor of the graphic card and the processors on the motherboard are equally utilized.

Handling of the editing modules and the execution sequence are conveniently displayed on the screen. The user can immediately view the execution sequence and can, for example, add or remove editing modules by using the drag and drop-functions, and create new nodes in the execution sequence.

With the method of this invention it is possible to use many editing parameters and to make changes. In doing so, many of the editing parameters are coupled to specific editing modules. Typical editing modules, which have been used in image and video processing for a long time, are for example, diffusing or high definition lenses, in which stated functions are applied to the image data and pixels respectively. In modules affecting the colors in which, for example, pixels can be directly allocated to colors or, according to the chosen color space, the color saturation, gray tones or color tones can also be changed. Further editing modules can also be displayed such as superimposition functions, mixing functions as well as modules which can display mathematical functions and text, -rendering, which can depict a given text on the screen in a stated manner with regard to typeset and other properties. Other editing modules include modules which produce geometrical forms or lines and modules capable of converting image data from two-dimensional data into three-dimensional data. Many of these editing modules are allocated to local editing parameters, for example, hues, saturation, radii for diffusing screens based on Gauss-functions. Other function parameters are global editing parameters.

For practical purposes the index i, which designates the partial images from the section 1 to n, is used as an editing parameter. When choosing a partial image I, either automatically or through a user, this will then be preferably displayed on the first screen. The partial image itself is two dimensional; therefore, a screen suitable for two-dimensional viewing is adequate. In this case the partial image can be viewed, as it appears at the end of the execution sequence, before it is combined with the other partial images into a stereoscopic image, or when choosing an editing module, even in such a way as it is shown on this node.

In a another embodiment, the image composed of the n partial images i is stereoscopically displayed on a second screen. In that way the user will at all times have the overall result before his eyes. The second screen is suitable for three-dimensional viewing, it can be used solely for three dimensional viewing, but can also be switched between two and three dimensional viewing. It is also viable to integrate the first and second screens into one common display, which is at least partially configured for three dimensional displays. The second screen is in that case suited for three dimensional display according to one or several known processes, for example, the display can take place by using a spectacle-free barrier- or filter array process m, such as a lenticular process, a spectacle-based process or a chronological sequential process, just to name a few.

What applies to individual images, also applies in principle to image sequences such as digital videos. In that case, the time t allocated to an image in this sequence, is used as editing parameter, optionally it is also the index i of a partial image. When choosing a tune a partial image i the relevant partial image is projected on to a first screen. The image composed of n partial images i can also at time t be presented stereoscopically at time t on a second screen, which is suitable for stereoscopic display. This screen can also be switched over between two dimensional and three dimensional mode of display, and can also be integrated together with the first screen into a common display.

According to the invention it is an advantage to display a three dimensional image or a three dimensional image sequence respectively, as the number of necessary computing operations is greatly reduced when changing the editing parameters and the graphics card is preferred for the computation of the editing steps. In this way there is hardly any time delay regarding feedback for the operator.

In another embodiment, the image and/or one or several frames i are put together from image data available to the editing module when the user selects an editing module. Thus, the end result being displayed is the image as it is available at this editing module, so that the effects of succeeding editing steps are masked. Thereby, one frame and/or the several frames i are displayed on a first screen and the image put together from the frames i is displayed stereoscopically on a second screen.

It is understood that the above mentioned and the subsequently described characteristics cannot only be used in the combinations stated herein, but also in other combinations or on their own, without going beyond the scope of the present invention.

DETAILED DESCRIPTION

Figure 1:
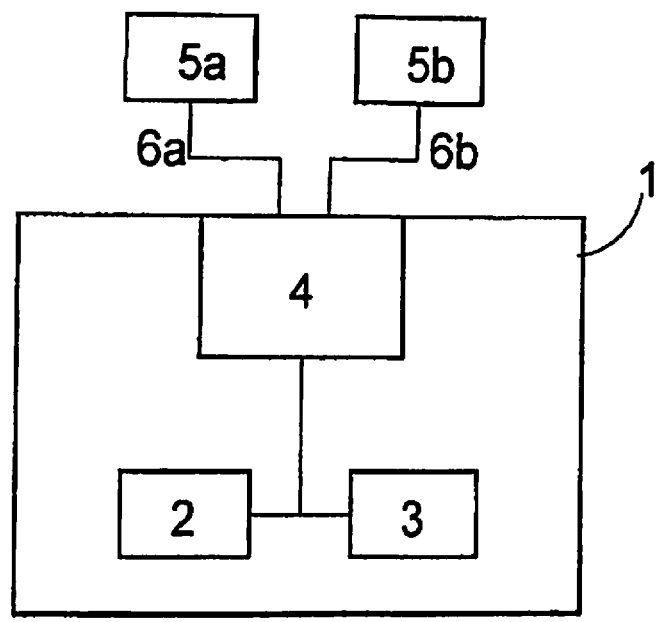
FIG. 1 is a schematic diagram of the structure of an arrangement that can be utilized for image processing according to one embodiment.

FIG. 1 firstly shows an arrangement with which a stereoscopic image, composed from image data of n frames i or a chronological sequence of such images, with n>1 and i=1, . . . , n, can be edited. The editing of the image can be carried out sequentially and/or parallel either entirely or partially, whereby the image data is edited in individual editing modules according to an execution sequence and depending on adjustable editing parameters. Such an arrangement can for example consist of a computer 1, whereby this can for example either be a powerful PC or a powerful notebook. The computer 1 comprises as essential component a motherboard 2, upon which random-access-memory modules are arranged. The images and/or image sequences are stored before and after editing on a hard disk 3 or on an equivalent readable and writable storage medium, if necessary the hard disk 3 can also be utilized for interim storage of image data, for example in the event that an editing status needs interim storage. A graphics card 4 is another essential component of the arrangement. The graphics card 4 preferably has exits for two screens 5a and 5b, of which screen 5a is suitable for the two-dimensional display and optionally for three-dimensional display and screen 5b is suitable for three-dimensional display. The screens 5a and 5b are connected to the interconnects of graphics card 4 via the data lines 6a and 6b.

Figure 2:
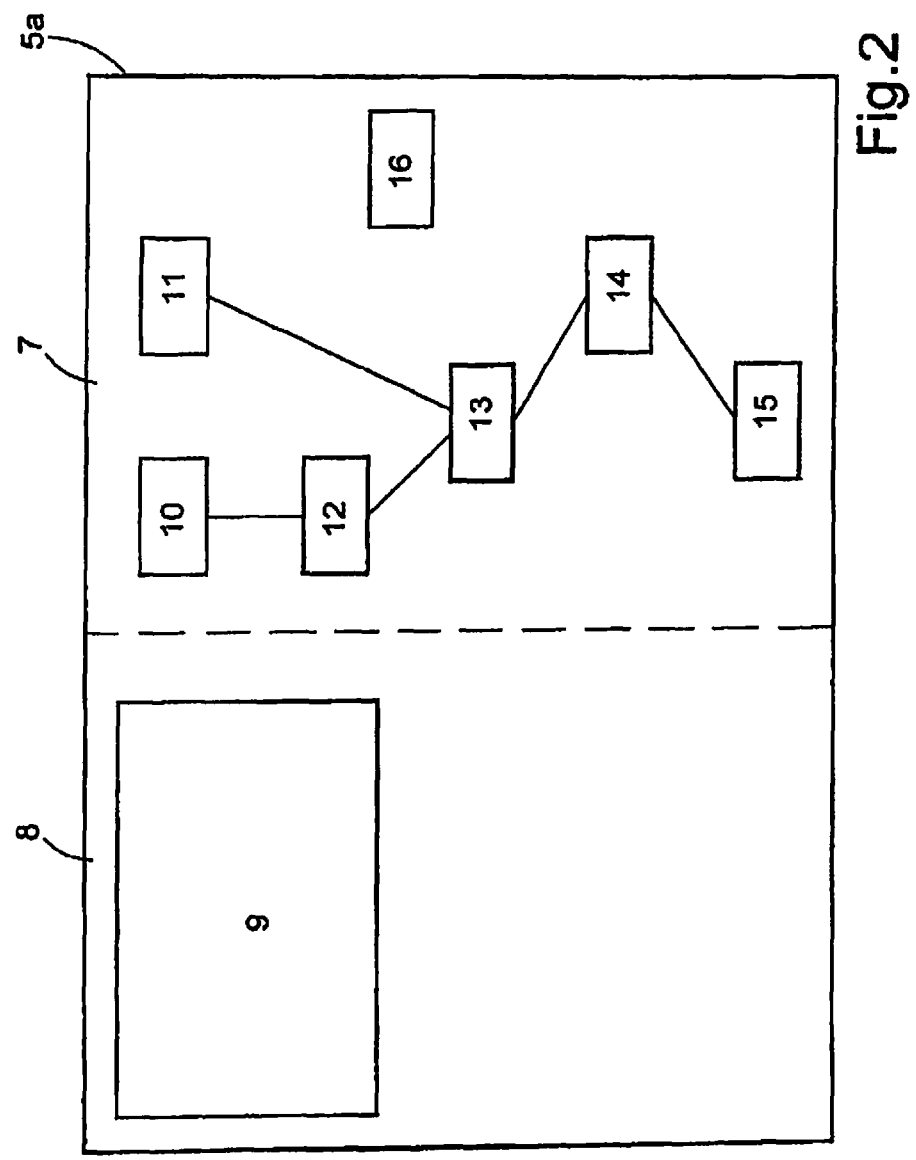
FIG. 2 is a schematic diagram of a screen during the editing of an image according to one embodiment.

FIG. 2 shows a segment of screen 5a. Non-essential graphic elements, which are necessary for operation, are not shown. Similarly, additional components that are usually part of computers as depicted in claim 1 are not shown. The screen 5a is subdivided into two halves, on the right half of the screen 7 an execution sequence is displayed, on the left half 8 one or several frames or the whole image can be shown in a two-dimensional or three-dimensional display in a window 9. The window 9 can also be displayed onto screen 5b, if it shows the composite stereoscopic image.

The execution sequence displayed on the right half 7 shows several editing modules 10, 11, 12, 13, 14, 15 and 16. In the nodes, the editing of the image is taking place either sequentially and/or parallel, and as a whole or in parts. Thereby, the image data is edited in the individual editing modules according to the execution sequence and depending on the adjustable editing parameters. Further, each editing module carries out one or several editing steps. In addition, each editing module is assigned to a node and this assignment is unequivocal. The execution sequence is determined by linking the nodes as per specification by a user or a program, thus the linkage is selectable.

In FIG. 2, the nodes and the editing modules are similarly symbolized by the drawn rectangles; the linkages are carried out in accordance with the drawn connecting lines. Therefore, the editing module 13 is for example linked with the editing modules 11 and 12 at its input side and with the editing module 14 at its exit side. The editing module 16, on the other hand, is not linked to any other module, but a user can interactively insert it into the tree structure, which is executed from top to bottom. Thereby a user can interactively select an editing module and, according to the image data available to the editing module, can then put together the image and/or one or several frames i. The one frame i or the several frames i are then displayed in window 9 of screen 5a, the image is displayed stereoscopically on screen 5b. Alternatively, it is also possible to only display the final result at the end of the execution sequence, in this case at the exit of editing module 15. The same applies if there is a chronological sequence of images, where the time t allocated to an image and additionally the frames i are used as editing parameters. If a time t and a frame i are selected, the respective frame is shown in window 9 and the resulting whole image at time t is displayed on screen 5b. Besides, each of the nodes can exchange data with the nodes it is linked to in accordance with the execution sequence.

In the present case, the shown execution sequence is to define a text that flies across the foreground of a scene from left to right. Besides a three-dimensional display it is therefore necessary that the text moves at a defined speed from left to right, while in relation to a particular vanishing point, the background scene moves at a slower speed from right to left or turns or stands still respectively. The essential properties of the text are determined in editing module 11. These properties include among others, the text itself, the font color, the font and the depth information. The image sequence produced from the data of editing module 11 thus only shows a colored text. The information in regard to the background scene is available in editing module 10. Both editing modules 10 as well as 11 can, for example, read their data from a hard disk. The present example also represents a chronological image sequence, which was pre-edited, however, so that no changes have to be made to this image sequence.

The editing module 10 transmits its image data to the editing module 12. In this editing module it is possible to edit for example the tinge of the background. Subsequently the image data from the editing modules 12 and 11 is transmitted to another editing module 13. In editing module 13 the image data of both editing modules is combined, meaning it is superimposed according to the depth information and a new whole image is generated. If the viewer thus only selects a frame i, the result in window 9 is only displayed for this frame i. But since all frames i are interlinked they can, for example, include different views of the same scene captured from different angles or layer images that show different depths of the same view. Thus it is possible to compute, at any time, the whole image based on this information, which is then displayed on screen 5b. Therefore, if changes are made to a frame only, for example if the color of the text is changed, it is possible to transfer these changes automatically to the other frames. In various embodiments, these computations are made in the background and they are optional.

After the combination of the image data the editing module 13 transmits the image data to editing module 14, where, for example, a Gaussian soft-focus lens or an accentuation of contrast, or an accentuation of the edges, etc. is applied to the whole image. The image data edited in editing module 14 is then transmitted to another last editing module 15. In editing module 15, the data of the image sequence is written onto a hard disk.

The described modules have been selected as examples only; additional editing modules like those normally used in image and video editing can of course also be utilized. It is also conceivable to integrate modules that transform two-dimensional into three-dimensional content. Furthermore, all popular input and output formats can be applied. To mention just a few these include in the case of still images for example bmp, jpg, gif, png, ria, tga, tiff, and the open-exr-formats and in the case of video files for example avi, mpeg2, and the mpeg4 formats, just to name a few. The modules may also apply to various multi-stream-formats.

If an editing parameter is changed, already edited image data can be stored in the editing modules, preferably in accordance with the type of editing steps that are to be carried out in an editing module. For example, if the user switches several times between the frames i, this is particularly advantageous as the image data of previously edited frames does not have to be re-computed if switching between frames occurs. The same also applies to the editing modules at preceding nodes: If a local editing parameter in a currently selected editing module is changed the image data of the preceding editing module does not need to be re-computed. For example, if the position of the text is changed in editing module 13, the editing modules 10, 11 and 12 maintain their image data so that it does not need to be re-computed if requested by editing module 13.

Figure 3:
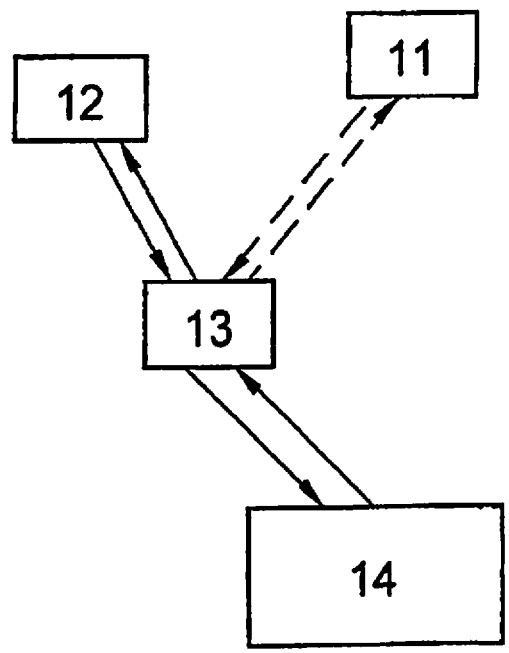
FIG. 3 is a schematic diagram of interlinked editing modules of the execution sequence shown in FIG. 2.

FIG. 3 shows a segment of the execution sequence of FIG. 2, and it serves to explain how to optimize or minimize the data volume to be transferred. In particular, FIG. 3 shows how to enable a real-time editing of 3D-video sequences, which are displayed on screen 5b. Communication between the editing modules is possible in both directions. If one or several editing parameters change, for example the if the display time t changes, or if another frame i is selected, or if the background tinge is changed in editing module 12, then for every two nodes interlinked in the execution sequence a preceding editing module—assigned to the preceding node within the execution sequence transmits to a succeeding editing module assigned to the succeeding node within the execution sequence. The segments of the image data available to the preceding editing module are affected by the change of the editing parameter. To re-determine the image data at the succeeding editing module, the succeeding editing module informs the preceding editing module which newly computed image data with the changed editing parameter(s) it requires for the execution of its editing steps. The preceding editing module re-computes only this image data and transmits it to the succeeding editing module. If the succeeding editing module does not require image data, there will also be no transmission to the preceding editing module.

For example, if being an editing parameter in editing module 11, the font color of the text that is supposed to fly across the foreground of the picture is changed from red to green, then for example, editing module 11 will inform editing module 13 that the entire area of the image or the frame in which the text is located according to editing module 11, is affected by this change. During or prior to the re-computation of the image data in editing module 13, the editing module informs editing module 11 that it requires the re-computed image data for the area of the image in which the color specifications of the text were modified so as to consider this correctly in the combination of the images. The area size is variable and can also turn out to be smaller if the text is partially covered in the composite image that is generated in editing module 13. The preceding module only needs to re-determine the image data for the requested area. Accordingly, the editing modules 13 and 14 also communicate with one another. After editing module 13 has informed editing module 14 which area is affected by the change, editing module 14 informs editing module 13 which image data from this area, i.e. which partial area it will require again. In this example, the soft-focus lens affects the whole image data. However, if the image data is not retransmitted and if no re-computation of the image data is carried out in editing module 14, the text in editing module 14 would still appear in the original color. The image data transmitted by editing module 12 to editing module 13 does not require re-computation.

Thereby the editing steps can at least partially be carried out on a graphics card. In this way it is possible to further speed up the process and to further improve the real-time impression for the user. For this, the operations from the editing modules are translated into graphics instructions for the graphics card. Thus, the graphics card must comply with stipulated standards, such as for example the OpenGL 2.0 standard. If the graphics card is being integrated, the editing steps can be carried out independent of the original image format, in general the RGB-Alpha format with 8-bit color depth. For computation, those formats can be used which utilize the structure of the graphics card at an optimum level and which also deliver a higher accuracy, for example RGB-Alpha with 10-bit color depth or $16/32$-bit-floating-point-format. In other embodiments, formats that store luminescence are also possible. In addition, not all editing steps must be carried out on the graphics card, simple and general operations can still be carried out on upstream, parallel or downstream processors, so as to sensibly employ additional computing resources.

If, following the change of an editing parameter, an editing module at a successive node does not require new image data from the preceding node, the successive node sends no notification to the editing module at the preceding node, so that there will also be no re-computation of the image data at the preceding node. For example, this can be the case if the text that flies across the screen stops approximately in the middle, so that there is no change in the animation time t, the editing parameter, and thus re-computation is not necessary. If an editing parameter is changed either in a module or globally, each editing module determines which of the image data it computes is changing and then recursively notifies all succeeding editing modules. Thereafter each of the succeeding editing modules determines which of the changed image data it requires. All succeeding editing modules recursively notify all preceding modules about what new data they require. This means that at each node the information is available specifying the preceding nodes and also which of the preceding nodes can affect the image data available at the present node. This information is derived automatically by means of the composition of the execution sequence by a user as well as by means of the above described functionality of the editing modules. If new nodes are inserted along with editing modules, this information is updated by the respective editing modules.

If an editing parameter in an editing module changes, then all possible succeeding nodes are determined and it is determined within the editing modules assigned to these nodes whether the image data will maintain or lose its validity. Thereby it is also possible that all image data loses its validity so that a complete re-computation is necessary. For example, in the case where there is a big leap in the animation time t of the image sequence.

By means of the above described method it is possible to edit 3D-image data and 3D-video sequences and to follow the editing result or the individual editing steps in real-time. In this manner the efficiency of image editing of stereoscopically displayable images and image sequences is markedly improved.

The invention claimed is:

1. A computer implemented method for editing a stereoscopic image composed from image data of a plurality of frames each frame including pixel image data depicting an image, the pixel data corresponding to data stored in an at least two dimensional matrix, indices of which correspond to coordinates in the image or a partial image and to one or several value groups for the indices, the pixel image data comprising a plurality of segments, editing of the pixel image data being carried out in a plurality of editing modules according to an execution sequence and depending on a plurality of adjustable editing parameters, each one of the plurality of editing modules executing at least one editing step, the execution sequence being determined by a selectable linking of the plurality of editing modules, wherein each one of the plurality of editing modules can exchange data with the editing modules it is linked to in accordance with the execution sequence, and wherein for each two of the editing modules linked in the execution sequence the method comprises:

communicating from a preceding one of the two editing modules to a succeeding one of the two editing modules, which segments of the pixel image data available to the preceding editing module are affected by a change to one of the plurality of editing parameters;

communicating from the succeeding editing module to the preceding editing module, which portions of the affected segments of the pixel image data are necessary for execution of the at least one editing step in the succeeding editing module; and transmitting from the preceding editing module to the succeeding editing module, re-computed pixel image data for only the portions of the affected segments of the pixel image data necessary for execution of the at least one editing step in the succeeding editing module;

wherein only a subset of pixel image data of a given frame which the succeeding editing module identifies as necessary is recomputed and transmitted by the preceding editing module to the succeeding editing module.

2. The method of claim 1, wherein the pixel image data already edited in each of the plurality of editing modules is stored in accordance with a type of editing steps that are carried out in the each of the plurality of editing modules.

3. The method of claim 1, wherein one of the plurality of adjustable parameters is time allocated.

4. The method of claim 1, wherein the plurality of frames are in chronological order.

5. A non-transitory computer-readable storage medium containing computer executable instructions for performing a method for editing a stereoscopic image composed from pixel image data of a plurality of frames, each frame including pixel image data depicting an image, the pixel data corresponding to data stored in an at least two dimensional matrix, indices of which correspond to coordinates in the image or a partial image and to one or several value groups for the indices, the pixel image data comprising a plurality of segments, editing of the pixel image data being carried out in a plurality of editing modules according to an execution sequence and depending on a plurality of adjustable editing parameters, each one of the plurality of editing modules executing at least one editing step, the execution sequence being determined by a selectable linking of the plurality of editing modules, wherein each one of the plurality of editing modules can exchange data with the editing modules it is linked to in accordance with the execution sequence, and wherein for each two of the editing modules linked in the execution sequence the method comprises:

communicating from a preceding one of the two editing modules to a succeeding one of the two editing modules, which segments of the pixel image data available to the preceding editing module are affected by a change to one of the plurality of editing parameters;

communicating from the succeeding editing module to the preceding editing module, which portions of the affected segments of the pixel image data are necessary for execution of the at least one editing step in the succeeding editing module; and transmitting from the preceding editing module to the succeeding editing module, re-computed pixel image data for only the portions of the affected segments of the pixel image data necessary for execution of the at least one editing step in the succeeding editing module;

wherein only a subset of pixel image data of a given frame which the succeeding editing module identifies as necessary is recomputed and transmitted by the preceding editing module to the succeeding editing module.

6. The computer-readable storage medium containing computer executable instructions for performing a method for editing a stereoscopic image composed from pixel image data of a plurality of frames of claim 5, wherein the pixel, image data already edited in each of the plurality of editing modules is stored in accordance with the type of editing steps that are carried out in the each of the plurality of editing modules.

7. The computer-readable storage medium containing computer executable instructions for performing a method for editing a stereoscopic image composed from pixel image data of a plurality of frames of claim 5, wherein one of the plurality of adjustable parameters is time allocated.

8. A system for performing a method for editing a stereoscopic image composed from pixel image data of a plurality of frames, the system comprising:

a computer having a memory configured to store pixel image data of the plurality of frames each frame including pixel image data depicting an image, the pixel data corresponding to data stored in an at least two dimensional matrix, indices of which correspond to coordinates in the image or a partial image and to one or several value groups for the indices, at least one screen, and a processor configured with instructions for carrying out the method, the pixel image data comprising a plurality of segments, editing of the pixel image data being carried out in a plurality of editing modules according to an execution sequence and depending on a plurality of adjustable editing parameters, each one of the plurality of editing modules executing at least one editing step, the execution sequence being determined by a selectable linking of the plurality of editing modules, wherein each one of the plurality of editing modules can exchange data with the editing modules it is linked to in accordance with the execution sequence, and wherein for each two of the editing modules linked in the execution sequence, the method comprises:

communicating from a preceding one of the two editing modules to a succeeding one of the two editing modules, which segments of the pixel image data available to the preceding editing module are affected by a change to one of the plurality of editing parameters;

communicating from the succeeding editing module to the preceding editing module, which portions of the affected segments of the pixel image data are necessary for execution of the at least one editing step in the succeeding editing module; and transmitting from the preceding editing module to the succeeding editing module, re-computed pixel image data for only the portions of the affected segments of the pixel image data necessary for execution of the at least one editing step in the succeeding editing module, wherein only a subset of pixel image data of a given frame which the succeeding editing module identifies as necessary is recomputed and transmitted by the preceding editing module to the succeeding editing module.

9. The system of claim 8, wherein the processor is a graphics processing unit (GPU).

10. The system of claim 8, wherein the processor is further configured with instructions for displaying visual depictions of the plurality of editing modules and the execution sequence on a first screen.

11. The system of claim 10, wherein the processor is further configured with instructions for allowing the plurality of editing modules to be selectable by a user, wherein the pixel image data of the frames i are put together from the pixel image data available to the editing module, and wherein the processor is further configured with instructions for displaying the frames i on the first screen and the image is displayed stereoscopically on a second screen.

12. The system of claim 8, wherein the processor is further configured with instructions for displaying a frame on a first screen if one of the plurality of adjustable editing parameters is i, and if a frame i or frames i is selected by a user.

13. The system of claim 12, wherein the processor is further configured with instructions for displaying a composite image stereoscopically on a second screen put together from a number n of frames i.

14. The system of claim 12, wherein the pixel image data may be arranged in chronological order and wherein a time t allocated to the pixel image data and a frame i are used as a first and second adjustable editing parameters, and wherein the processor is further configured with instructions for displaying a result of setting the first and second adjustable editing parameters on a first screen.

15. The system of claim 14, wherein the processor is further configured with instructions for displaying a composite image stereoscopically on a second screen put together from a number n of frames i at the time t.

* * * * *

UNITED STATES PATENT AND TRADEMARK OFFICE
CERTIFICATE OF CORRECTION

PATENT NO.      : 8,817,013 B2           Page 1 of 1
APPLICATION NO. : 12/669014
DATED           : August 26, 2014
INVENTOR(S)     : Jens Meichsner It is certified that error appears in the above-identified patent and that said Letters Patent is hereby corrected as shown below:

On the title page item (57) Abstract, please replace the existing Abstract with the following:

The invention relates to a method for processing a spatial image assembled from partial images or a time sequence of such images by processing the image data in individual processing modules according to an execution sequence and depending on adjustable processing parameters, wherein each module performs processing steps and the sequence is determined by a selectable linking of the nodes, whereby each node is linked with nodes according to the editing sequence and is able to exchange data. Further, each module is able to exchange data with the modules to which it is linked. If parameters are changed for two modules linked to each other in the execution sequence, (a) an upstream module transmits to a downstream module which areas of the image data present at the upstream module are affected by the change, (b) the downstream module transmits to the upstream module which image data it requires to perform the processing steps thereof. The upstream module recalculates only said image data, and transmits them to the downstream module.

In the Specification

Col. 2, line 30, after "are" insert --adequate--
Col. 3, line 15, delete the second occurrence of "that"
Col. 3, line 36, delete "to a"
Col. 3, line 63, delete "one"
Col. 3, line 66, delete "us"
Col. 5, line 39, after "Format" insert --.--
Col. 6, line 25, delete "a"
Col. 6, line 44, delete "tune" and insert --time +--
Col. 9, line 31, delete the first occurrence of "the"

Signed and Sealed this
Twenty-second Day of September, 2015

Michelle K. Lee
*Director of the United States Patent and Trademark Office*